(12) United States Patent
Liang et al.

(10) Patent No.: US 10,170,750 B2
(45) Date of Patent: Jan. 1, 2019

(54) LITHIUM-CONDUCTING SULFUR COMPOUND CATHODE FOR LITHIUM-SULFUR BATTERIES

(71) Applicant: UT-BATTELLE, LLC, Oak Ridge, TN (US)

(72) Inventors: Chengdu Liang, Knoxville, TN (US); Nancy J. Dudney, Knoxville, TN (US); Zhan Lin, Albany, CA (US); Zengcai Liu, Savoy, IL (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 107 days.

(21) Appl. No.: 15/264,321

(22) Filed: Sep. 13, 2016

(65) Prior Publication Data
US 2017/0005326 A1 Jan. 5, 2017

Related U.S. Application Data

(62) Division of application No. 13/974,854, filed on Aug. 23, 2013, now Pat. No. 9,466,834.

(51) Int. Cl.
H01M 4/1397 (2010.01)
H01M 4/136 (2010.01)
H01M 4/58 (2010.01)
H01M 4/62 (2006.01)
H01M 10/0525 (2010.01)
H01M 10/058 (2010.01)
H01M 4/02 (2006.01)
H01M 4/04 (2006.01)
H01M 10/0562 (2010.01)

(52) U.S. Cl.
CPC ......... H01M 4/1397 (2013.01); H01M 4/136 (2013.01); H01M 4/5815 (2013.01); H01M 4/622 (2013.01); H01M 4/625 (2013.01); H01M 10/058 (2013.01); H01M 10/0525 (2013.01); H01M 4/0407 (2013.01); H01M 10/0562 (2013.01); H01M 2004/028 (2013.01); H01M 2220/20 (2013.01); H01M 2300/0068 (2013.01); H01M 2300/0071 (2013.01); Y02E 60/122 (2013.01); Y02P 70/54 (2015.11); Y02T 10/7011 (2013.01)

(58) Field of Classification Search
CPC ............. H01M 4/1397; H01M 4/0407; H01M 4/5815; H01M 4/136; H01M 4/625; H01M 10/058; H01M 10/0525; H01M 2004/028; Y02E 60/122
See application file for complete search history.

(56) References Cited

U.S. PATENT DOCUMENTS 5,277,524 A 1/1994 Chung
6,706,449 B2 3/2004 Mikhaylik et al.
6,723,140 B2 4/2004 Chu et al.
7,416,815 B2 8/2008 Ota et al.
2005/0008938 A1 1/2005 Cho et al.
2005/0107239 A1 5/2005 Akiba et al.
2007/0160911 A1 7/2007 Senga et al.
2011/0123868 A1 5/2011 Kawaoka et al.

FOREIGN PATENT DOCUMENTS

JP 2002109955 4/2002

OTHER PUBLICATIONS

Lin et al. "Lithium polysulfidophosphates: a family of lithium-conducting sulfur-rich compounds for lithium-sulfur batteries", Angewandte Chemie, International Edition (2013), 52(29), pp. 7460-7463, First published Jun. 4, 2013.
Armand et al., "Building better batteries", Nature (2008) 451: 652-657.
Guo et al., "Sulfur-impregnated disordered carbon nanotubes cathode for lithium-sulfur batteries", Nano Lett. (2011) 11: 4288-4294.
Hassoun et al., "Moving to a solid-state configuration: a valid approach to making lithium-sulfur batteries viable for practical applications", Adv. Mater. (2010) 22: 5198-5201.
Homma et al., "Structure of lithium solid electrolyte Thio-LISICON, Li3PS4—Correction of structure and ion-conduction", The Electrochemical Society, 214th ECS Meeting, Abstract #10. (1 page).
Jayaprakash et al., "Porous hollow carbon@sulfur composites for high-power lithium-sulfur batteries", Angew. Chem. Int. Edit. (2011) 50: 5904-5908.
Ji et al., "A highly ordered nanostructured carbon-sulphur cathode for lithium-sulphur batteries", Nat Mater (2009) 8: 500-506.
Ji et al., "Graphene oxide as a sulfur immobilizer in high performance lithium/sulfur cells", J Am Chem Soc. (2011) 133: 18522-18525.
Kobayashi et al., "All solid-state battery with sulfur electrode and Thio-LISICON electrolyte", J. Power Sources (2008) 182: 621-625.
Li et al., "Electrochemical properties of PABTH as cathode materials for rechargeable lithium battery", Electrochem. Commun. (2007) 9: 1217-1221.
Liang et al., "Hierarchically structured sulfur/carbon nanocomposite material for high-energy lithium battery", Chem. Mater. (2009) 21: 4724-4730.
Liu et al., "Influence of coexisting Li3PO4 on electrochemical properties of LiFePO4", Journal of the Chinese Ceramic Society (2011) 39(4): 559-562.
Mizuno et al., "New, highly ion-conductive crystals precipitated from Li2S-P255 glasses", Adv. Mater. (2005) 17: 918-921.
Murayama et al., "Synthesis of new lithium ionic conductor Thio-LISICON—Lithium silicon sulfides system", Journal of Solid State Chemistry (2002) 168:140-148.
Njorge, "Energy focus: Novel graphene-sulfur composite with high capacity and high stability cathode for lithium-ion batteries", MRS Bull. (2011) 36: 669.

(Continued)

Primary Examiner — Laura Weiner
(74) Attorney, Agent, or Firm — Fox Rothschild LLP

(57) ABSTRACT

A lithium sulfur cell has a cathode including $Li_3PS_{4+n}$ (0<n<9), an electrolyte, and an anode comprising lithium. A cathode for a lithium sulfur cell is also disclosed.

21 Claims, 8 Drawing Sheets

(56) References Cited

OTHER PUBLICATIONS

Nuli et al., "A new class of cathode materials for rechargeable magnesium batteries: Organosulfur compounds based on sulfur-sulfur bonds", Electrochem. Commun. (2007) 9: 1913-1917.
Shim et al., "The lithium/sulfur rechargeable cell—Effects of electrode composition and solvent on cell performance", J. Electrochem. Soc. (2002) 149: A1321-1325.
Wang et al., "Sulfur composite cathode materials for rechargeable lithium batteries", Adv. Funct. Mater. (2003) 13: 487-492.
Wang et al., "Sulfur-mesoporous carbon composites in conjunction with a novel ionic liquid electrolyte for lithium rechargeable batteries", Carbon (2008)46: 229-235.
Wang et al., "Sulfur-graphene composite for rechargeable lithium batteries", J. Power Sources (2011) 196: 7030-7034.
Xiao et al., "A soft approach to encapsulate sulfur: polyaniline nanotubes for lithium-sulfur batteries with long cycle life", Adv. Mater. (2012) 24: 1176-1181.
Yang et al., "Improving the performance of lithium-sulfur batteries by conductive polymer coating", ACS Nano (2011) 5: 9187-9193.
Zheng et al., "Hollow carbon nanofiber-encapsulated sulfur cathodes for high specific capacity rechargeable lithium batteries", Nano Lett. (2011) 11: 4462-4467.

LITHIUM-CONDUCTING SULFUR COMPOUND CATHODE FOR LITHIUM-SULFUR BATTERIES

CROSS REFERENCE TO RELATED APPLICATIONS

This Application is a divisional application of U.S. application Ser. No. 13/974,854 filed Aug. 23, 2013, now U.S. Pat. No. 9,466,834, issued on Oct. 11, 2016, the entirety of which is hereby incorporated herein by reference.

STATEMENT REGARDING FEDERALLY SPONSORED RESEARCH

This invention was made with government support under contract No. DE-AC05-00OR22725 awarded by the U.S. Department of Energy. The government has certain rights in this invention.

FIELD OF THE INVENTION

This invention relates generally to lithium-sulfur batteries, and more particularly to cathodes for lithium sulfur batteries.

BACKGROUND OF THE INVENTION

Global green-house and energy concerns have accelerated the electrification of vehicles, which has resulted in a great demand for rechargeable batteries with high energy and power densities. Among various rechargeable batteries for electric vehicles, lithium-ion (Li-ion) batteries have received much attention for their scientific and commercial significance. $LiFePO_4$, one of the most promising cathode materials in Li-ion batteries, has been widely studied owing to its low cost and environmental and safety characteristics. However, the practical application of $LiFePO_4$ was hindered for a long time due to its intrinsically low electronic and ionic conductivity. Good electronic and ionic conductivity are required from an electrode material for the long-term cycling of rechargeable lithium batteries. In response to the considerable challenges of $LiFePO_4$, many research groups proposed to improve its conductivities by reducing the particle size or coating particles with conductive materials such as carbon. The importance of good ionic and electronic conductivity from an electrode material has been proven by $LiCoO_2$, a cathode material widely used in Li-ion batteries which dominate the current electronics market. Therefore, although Li-ion batteries are considered to be a promising system for green transportation, reaching beyond their horizon is a formidable challenge due to the limited energy density which results from the low capacity of $LiFePO_4$ (170 mAh $g^{-1}$) and $LiCoO_2$ (136 mAh g−1). In comparison, the theoretically significantly higher capacity of sulfur (1,675 mAh $g^{-1}$) makes it emerge as one of the most promising cathode materials for rechargeable lithium batteries, i.e., lithium-sulfur (Li—S) batteries.

A typical Li—S cell includes sulfur as the positive electrode and lithium as the negative electrode, with a liquid electrolyte as both the charge transfer medium and ionic conductor within the sulfur-containing cathode. Under intense study for more than two decades, there is still no system that works well as a Li—S battery. This is due to the well-known fact that sulfur or sulfur compounds are not only highly electronically insulating but also ionically inactive. Until now, most research has been focused on the synthesis of carbon materials with high surface area for the electronic enhancement of the sulfur cathode. The liquid electrolyte has been used to improve the ionic conductivity of sulfur and its compounds that rely on dissolution in the liquid electrolyte. However, the dissolution of sulfur compounds lead to the polysulfide shuttle, which migrates sulfur species to chemically react with the lithium anode and results in the loss of active materials and poor cycling performance. Though many materials, such as nanostructured carbons, polymers, or graphene composites, were synthesized to retard the diffusion of the bulky polysulfides out of the cathode into electrolyte, the polysulfide shuttle cannot be fully prevented as evidenced by the gradual capacity fading during cycling. There remains a need to improve the intrinsic ionic conductivity of sulfur in Li—S batteries without depending on the liquid electrolyte.

SUMMARY OF THE INVENTION

A lithium sulfur cell includes a cathode comprising $Li_3PS_{4+n}$ (0<n<9); an electrolyte; and an anode comprising lithium.

The cathode can comprise $Li_3PS_5$, $Li_3PS_6$, $Li_3PS_7$, $Li_3PS_8$, $Li_3PS_9$, $Li_3PS_{10}$, $Li_3PS_{11}$, $Li_3PS_{12}$, and combinations thereof.

The electrolyte can comprise lithium thiophosphate, lithium lanthanum zirconium oxide, lithium lanthanum titanium oxide, lithium boron hydride, and lithium iodide, and combinations thereof.

The anode can comprise at least one selected from the group consisting of lithium, silicon, silicon monoxide, tin, and tin oxide.

A cathode for a lithium sulfur cell comprises $Li_3PS_{4+n}$ (0<n<9). The cathode can comprise $Li_3PS_5$, $Li_3PS_6$, $Li_3PS_7$, $Li_3PS_8$, $Li_3PS_9$, $Li_3PS_{10}$, $Li_3PS_{11}$, $Li_3PS_{12}$, and combinations thereof.

A method of making a cathode for a battery includes the step of reacting sulfur with $Li_3PS_4$ in a liquid solvent such as THF, acetonitrile, dimethoxylethane, glyme solvents and ethers to provide a composition comprising $Li_3PS_{4+n}$ (0<n<9). A slurry is created with the compound, a binder and carbon. A cathode is then formed with the slurry.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

A lithium sulfur cell includes a cathode comprising $Li_3PS_{4+n}$ (0<n<9), an electrolyte; and an anode comprising lithium. The cathode can comprise at least one of $Li_3PS_5$, $Li_3PS_6$, $Li_3PS_7$, $Li_3PS_8$, $Li_3PS_9$, $Li_3PS_{10}$, $Li_3PS_{11}$, $Li_3PS_{12}$, and mixtures thereof.

The electrolyte can be any suitable electrolyte. The electrolyte can comprise lithium thiophosphate, lithium lanthanum zirconium oxide, lithium lanthanum titanium oxide, lithium boron hydride, and lithium iodide, and any combination of these compounds.

Any suitable anode construction can be utilized, including, for example and without limitation, lithium, silicon, silicon monoxide, tin, and tin oxide.

A lithium-conducting sulfur compound according to the invention has an ionic conductivity of $3.0 \times 10^{-5}$ S cm$^{-1}$ at 25° C. (FIG. 1), which is 5 orders of magnitude higher than that of $Li_2S$ ($2 \times 10^{-10}$ S cm$^{-1}$) of prior lithium sulfur cells. This ionic conductivity is comparable to that of $LiFePO_4$ ($5.0 \times 10^{-5}$ S cm$^{-1}$) and $LiCoO_2$ ($7.2 \times 10^{-5}$ S cm$^{-1}$).

Figure 2:
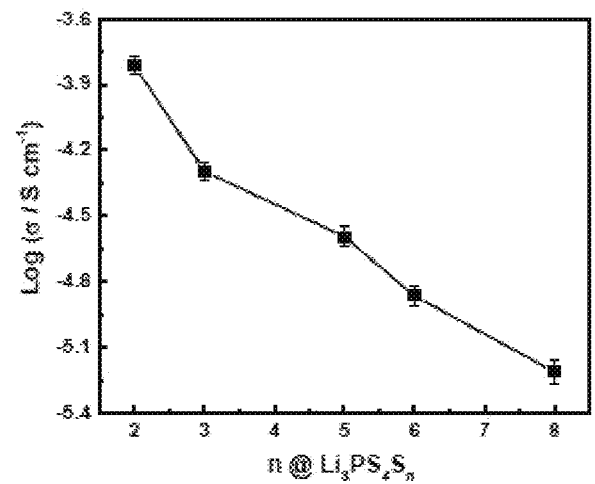
FIG. 2 is a plot of the ionic conductivity of $Li_3PS_{4+n}$ (n=2, 3, 5, 6 and 8) at 25° C.

The sulfur compound of the invention shows near-theoretical capacity, which is 10 times higher than $LiFePO_4$ and long-term cyclability of 300 cycles without significant capacity decay due to the elimination of the polysulfide shuttle. With increase in temperature, the ionic conductivity of this sulfur compound $Li_3PS_{4+n}$ (n=5) improves by one order of magnitude, from $10^{-5}$ S cm$^{-1}$ at 25° C. to $10^{-4}$ S cm$^{-1}$ at 60° C. The activation energy is 0.37 eV. Moreover, with an increase in the sulfur content within the compound, the ionic conductivity of the compound $Li_3PS_{4+n}$ decreases (FIG. 2). However, the ionic conductivity of the sulfur compound $Li_3PS_{4+n}$, for example at n=8, is still within the range of $10^{-5}$ S cm$^{-1}$ at 25° C.

The sulfur compound $Li_3PS_{4+n}$ (0<n<9) of the invention can be synthesized by any suitable reaction methodology. In one aspect, the sulfur compound of the invention is synthesized through the wet-chemical reaction of the solid electrolyte $Li_3PS_4$ and elemental sulfur in tetrahydrofuran (THF). Sulfur is reacted with $Li_3PS_4$ in a liquid solvent such as THF, acetonitrile, dimethoxyethane, glyme solvents and ethers to produce $Li_3PS_{4+n}$. The reaction in one embodiment is conducted at room temperature but can be conducted at any temperature in the liquid temperature range of the solvent. The reaction is insensitive to concentration and pressure.

Figure 3:
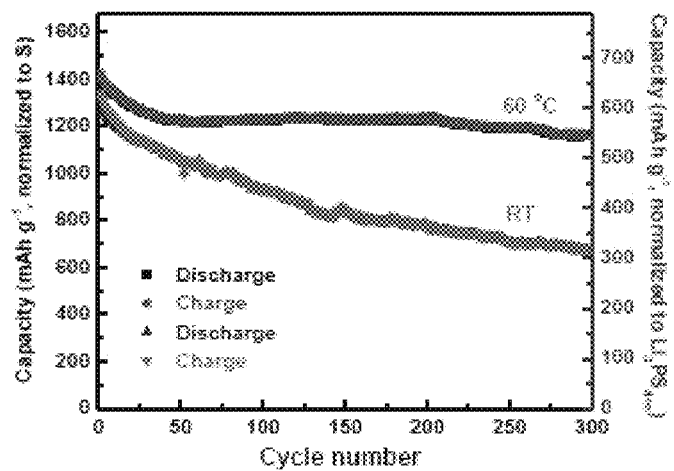
FIG. 3 is a plot of the cycling performance of $Li_3PS_{4+n}$ (n=5) at the rate of C/10 at RT and 60° C.
Figure 11:
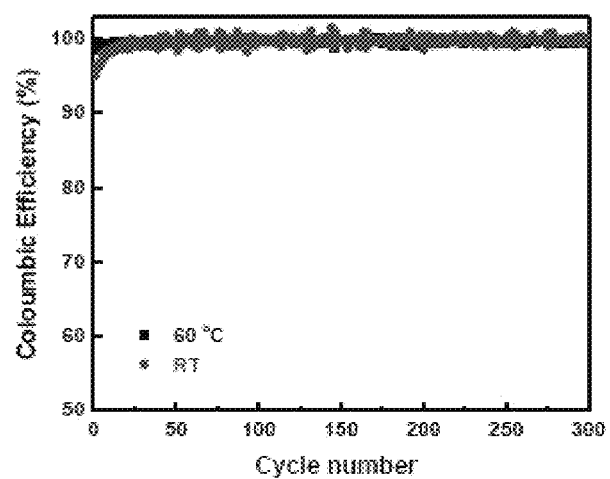
FIG. 11 is a plot of the coulombic efficiency of $Li_3PS_{4+n}$ (n=5) at room temperature and 60° C.

The compound $Li_3PS_{4+n}$ (n=5) used as the cathode material in rechargeable lithium batteries at room temperature (RT) shows an initial discharge capacity of 1,272 mAh g$^{-1}$ (based on the sulfur content) or 599 mAh g$^{-1}$ (based on the sulfur compound) with a reversibility of 95% (FIG. 3). After a few cycles, the reversibility gradually increases to 100% (FIG. 11). Such a high coulombic efficiency indicates the elimination of the polysulfide shuttle, which has been proven to be the main cause of low coulombic efficiency in Li—S battery cells when using the liquid electrolyte. After 300 cycles the capacity is stable at 700 mAh g$^{-1}$. The capacities are normalized to the sulfur content in the compound; however, the normalized capacities based on the compound are also shown. The good reversibility and excellent cycling performance is due to the great improvement in the ionic conductivity of this sulfur compound without relying on the liquid electrolyte and subsequently the elimination of polysulfide shuttle.

Figure 1:
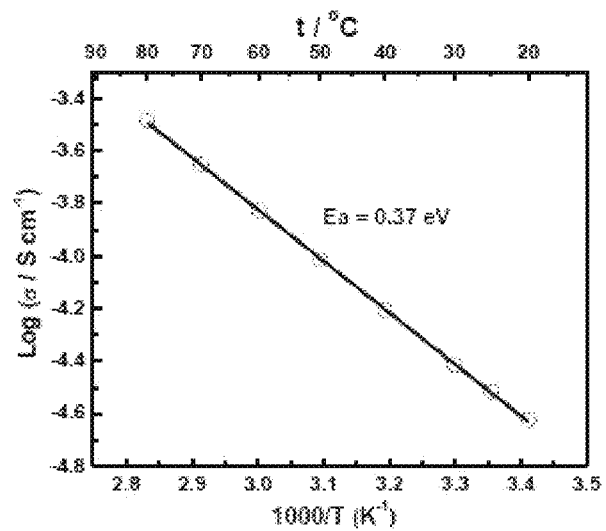
FIG. 1 is a plot of the ionic conductivity of $Li_3PS_{4+n}$ (n=5) in the temperature range of 20-80° C.
Figure 4:
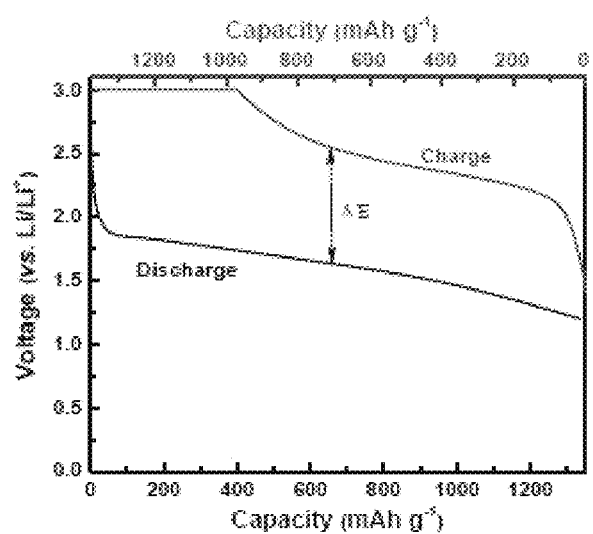
FIG. 4 is a plot of the voltage profile of $Li_3PS_{4+n}$ (n=5) at room temperature.
Figure 5:
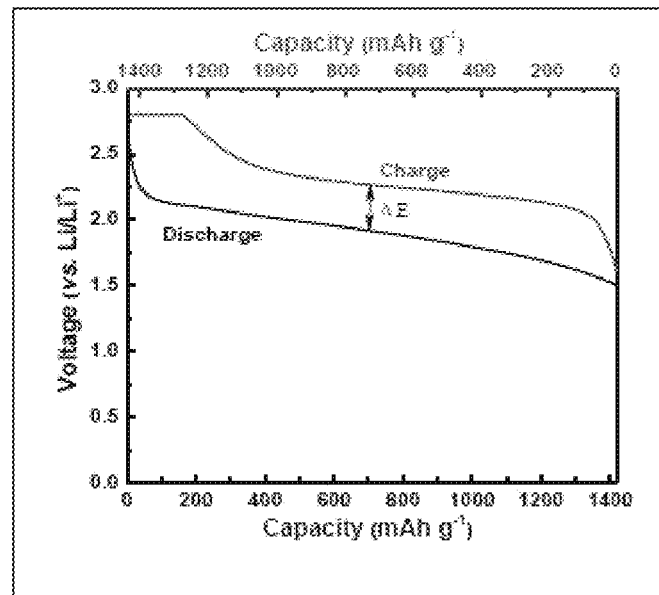
FIG. 5 is a plot of the voltage profile of $Li_3PS_{4+n}$ (n=5) at 60° C.
Figure 12:
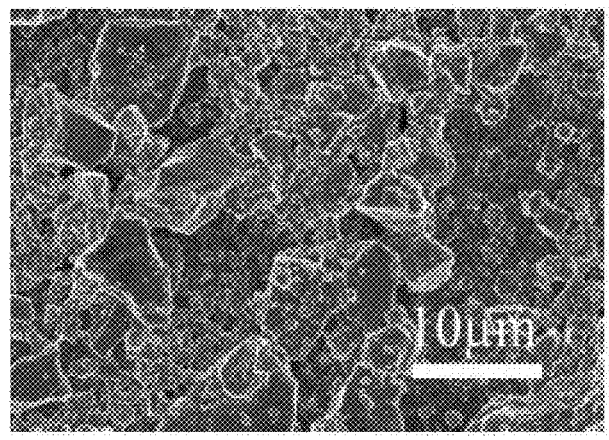
FIG. 12 is a scanning electron microscope (SEM) image of $Li_3PS_{4+n}$ (n=5) before cycling at 60° C.
Figure 13:
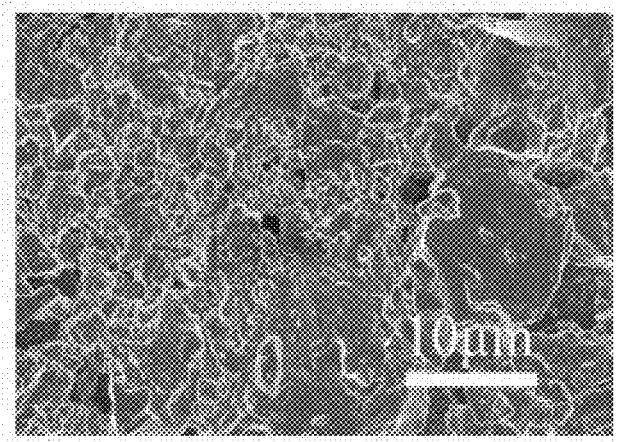
FIG. 13 is a scanning electron microscope (SEM) image of $Li_3PS_{4+n}$ (n=5) after cycling at 60° C.

In order to further confirm the importance of the ionic conductivity, a Li—S cell was tested using $Li_3PS_{4+n}$ (n=5) as the cathode material at 60° C., since its ionic conductivity is one order of magnitude improved from $10^{-5}$ S cm$^{-1}$ at 25° C. to $10^{-4}$ S cm$^{-1}$ at 60° C. (FIG. 1). Compared to the voltage profile at RT, the charge/discharge potential difference of the sulfur compound is greatly reduced; while the energy efficiency of the cathode electrode is enhanced from 59.7% at RT to 82.8% at 60° C. (FIGS. 4 and 5). Unlike two plateaus in the voltage profile when using liquid electrolytes, there is just one plateau when using this sulfur compound as the cathode material in Li—S batteries. In FIG. 3, the initial discharge capacity of the sulfur compound is 1,401 mAh g$^{-1}$, which accounts for the 83.6% of sulfur utilization based on the theoretical maximum 1,675 mAh g$^{-1}$. Slight capacity fading is observed before the 50$^{th}$ cycle, and then the discharge capacity stabilizes at 1,200 mAh g$^{-1}$. After 300 cycles, the discharge capacity of the sulfur compound still remains above 1,000 mAh g$^{-1}$. The experimental cell has a high initial coulombic efficiency of 98.5% and a coulombic efficiency of 100% after 50 cycles (FIG. 11). The excellent cycling performance is due to the good ionic conductivity of the sulfur compound and complete electrode integrity without using the liquid electrolyte, as shown in FIGS. 12-13.

Figure 6:
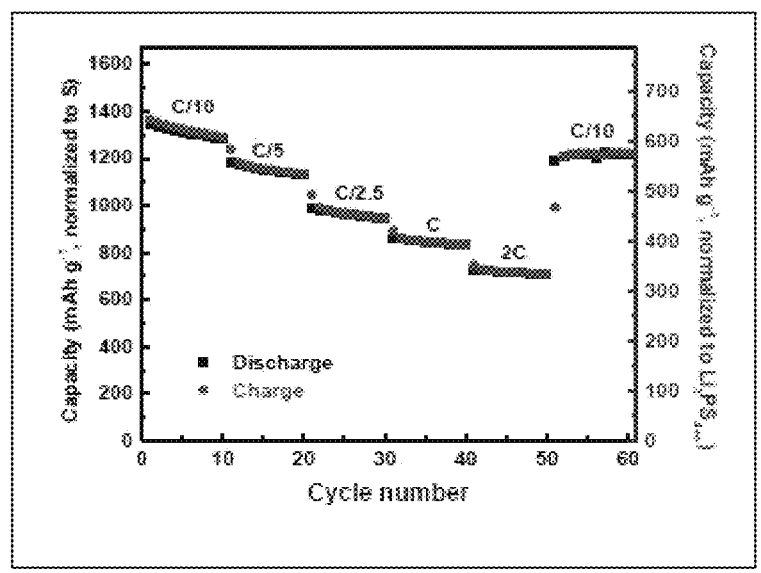
FIG. 6 is a plot of the rate capabilities of $Li_3PS_{4+n}$ (n=5) from C/10-2C at 60° C.

Due to the one magnitude enhancement of the ionic conductivity of the sulfur compound $Li_3PS_{4+n}$ (n=5) from RT to 60° C., the sulfur compound as the cathode material in Li—S batteries under was tested at high current densities at 60° C., and the results are shown in FIG. 6. While the current density increases from C/10 to 2C, the capacity of the sulfur compound decreases slightly. The cell shows a reversible capacity of 735 mAh g$^{-1}$ at 2C after 50 cycles at various rates, and further cycling at a low rate of C/10 brings it back to a reversible capacity of 1,200 mAh g$^{-1}$. FIG. 6 demonstrates the benefit of having a sulfur compound with superionic conductivity for high power density lithium batteries, because the excellent ionic conductivity of the sulfur compound greatly improves the electrode kinetics at the elevated temperature of 60° C.

A series of sulfur compounds $Li_3PS_{4+n}$ (0<n<9) were synthesized. The weak chemical bonds between sulfur and $Li_3PS_4$ in the sulfur compounds make them dissolve well in THF, compared to the solubility of sulfur and $Li_3PS_4$. Equation 1 illustrates the reaction between sulfur and $Li_3PS_4$

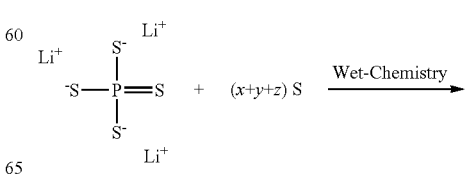

-continued

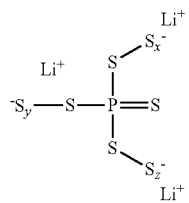

At the beginning, free radicals are determined by the following rapid radical displacement reaction, as shown in equation 2:

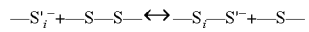

The activation energy for the above reaction is derived as 12 kJ mol$^{-1}$. The radicals are believed to move rapidly around and chain-like molecules are constantly formed. With more sulfur adding to the solution, the average length (n) of the sulfur chain increases, and the colors of the solution become darker. When these sulfur compounds are used as cathode materials in rechargeable lithium batteries, it is feasible to have the disulfide (—S—S—) redox couple cycled via a highly reversible redox reaction. Organosulfur compounds with the thiol (—SH)/disulfide (—S—S—) redox couple have been reported as cathode materials in rechargeable lithium batteries; however, they have poor ionic conductivity and low capacity. In comparison, the sulfur compound $Li_3PS_{4+n}$ (0<n<9) can store large amounts of charge per unit mass in rechargeable lithium batteries, even up to 1,000 mAh g$^{-1}$ (based on the compound) with the increase in the sulfur content; however, the ionic conductivity of the compound decreases (FIG. 2). Thus in order to enhance the lithium storage capacity of the compound, the sulfur loading can be high but the cycling current density could be sacrificed.

Equation 3 illustrates the mechanism during charge/discharge.

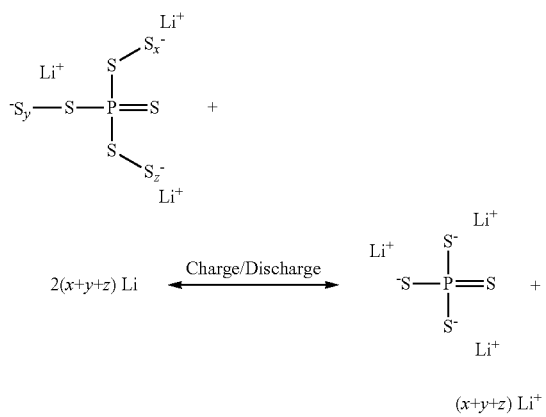

Figure 7:
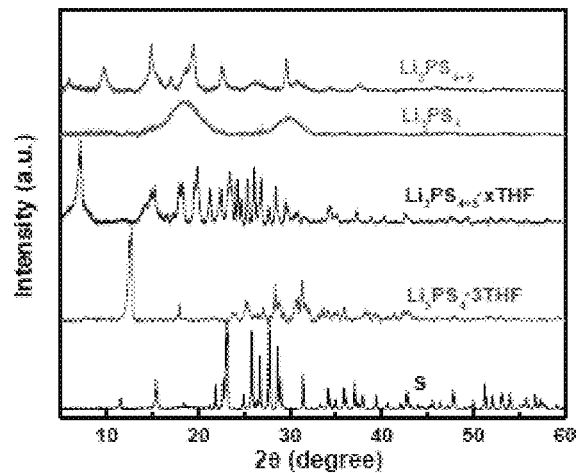
FIG. 7 is an XRD pattern of S, $Li_3PS_4$ and $Li_3PS_{4+n}$ (n=5) at room temperature and 80° C.
Figure 8:
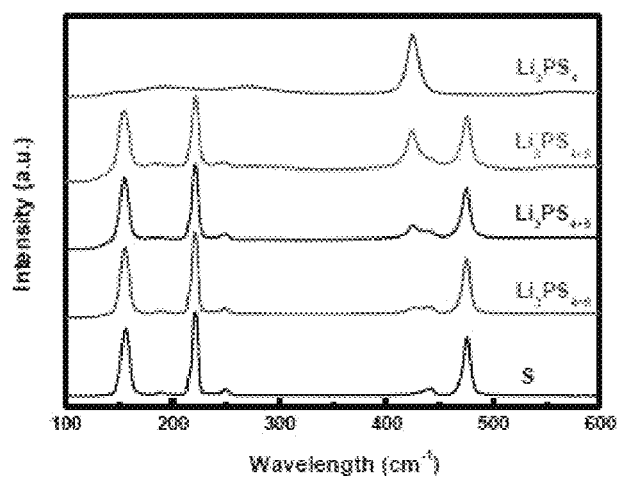
FIG. 8 is a plot of the Raman spectra of S, $Li_3PS_4$ and $Li_3PS_{4+n}$ (n=3, 5 and 6).
Figure 9:
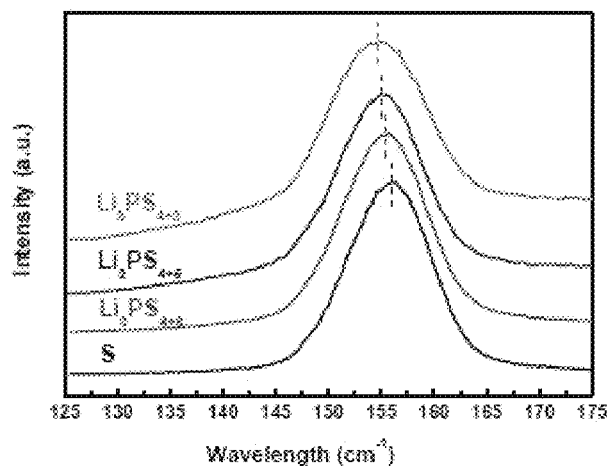
FIG. 9 is a plot of the Raman shift between the wavelengths of 125-175 $cm^{-1}$.
Figure 10:
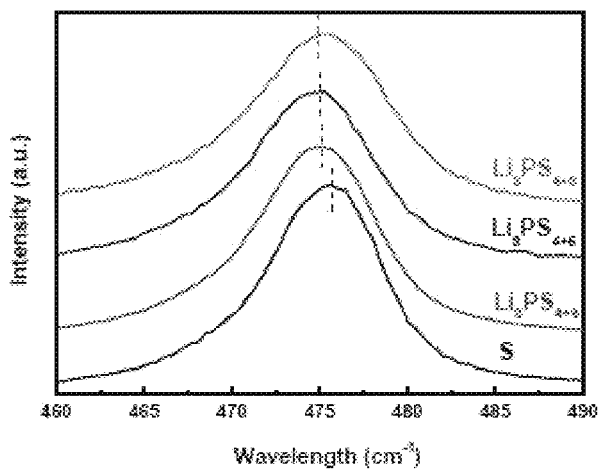
FIG. 10 is a plot of the Raman's shift between the wavelengths of 460-490 cm$^{-1}$.

X-ray diffraction (XRD) and Raman spectra in FIG. 3 verify the chemical structure of the sulfur compound. Compared to the sulfur and $Li_3PS_4$ in FIG. 7, a new crystalline structure of the sulfur compound $Li_3PS_{4+n}$ (n=5) is formed during synthesis. After the removal of the THF at 80° C. under vacuum, the $Li_3PS_4$ become amorphous while the $Li_3PS_{4+n}$ (n=5) is still in the crystalline form. The crystalline structure of the sulfur compound becomes different compared to that at RT. From the Raman spectra in FIG. 8, the predominate peak of the $Li_3PS_{4+n}$ (n=3, 5, and 6) at 418 cm$^{-1}$ is due to the symmetric stretching of the —P—S bond and the weak peak of 184 cm$^{-1}$ is from the stretching vibrations of the —P—S bond in $PS_4^{3-}$ ions with $T_d$ symmetry; the peaks centered at 155 cm$^{-1}$, 218/476 cm$^{-1}$, and 248/437 cm$^{-1}$ are assigned to the $E_2$, $A_1$, and $E_3$ symmetry species of the —S—S— bond, respectively. With decrease in the sulfur content in the compound, the —S—S— bond peaks at 155 and 476 cm$^{-1}$ shift to the lower wavelength (FIGS. 9 and 10), which result from the vibration effect of the P—S bond in $PS_4^{3-}$ and the length of sulfur chain in the compound.

EXAMPLE

The sulfur compound $Li_3PS_{4+n}$ (n=2, 3, 5, 6, and 8) was synthesized through the wet-chemical reaction of the solid electrolyte $Li_3PS_4$ and elemental sulfur in the solvent of tetrahydrofuran (THF) under sonication. After being fully dissolved, the sulfur compound was heat-treated under vacuum for 2 hours at 80° C. to remove the THF. A cathode slurry was prepared with the sulfur compound (60 wt %), WVA-1500 carbon (MeadWestvaco Corporation, 30 wt %), and PVC binder (10 wt %) using THF as the solvent. After 0.5 hour's sonication, the cathode slurry was coated on the solid electrolyte side of the pilot, which was pressed by the lithium metal and solid electrolyte $Li_3PS_4$ under 8 MPa. The diameter and the thickness of the pilot were 0.5 inch (1.27 cm) and 0.5 mm, respectively. The pilot of the sulfur compound was also prepared under 8 MPa for its conductivity measurement.

The ionic conductivity of the sulfur compound was determined in the frequency range of 10 MHz to 1 Hz with an amplitude of 10 mV by using a frequency response analyzer (Solartron 1260). Swagelok cells were used to evaluate the cycling performance. Low surface area carbon black (surface area ~50 m$^2$/g) coated aluminum foil was used as the current collector. Charge and discharge were carried out using a Maccor 4000 series battery tester at a current density of 0.015 mA cm$^{-2}$ (C/10) between the cut-off potentials of 1.5-2.8 V vs. Li/Li$^+$. The current densities of 0.03 (C/5), 0.075 (C/2.5), 0.15 (C), and 0.2 (2C) mA cm$^{-2}$ were applied to measure the rate capabilities of the sulfur compound cathode. The calculation of specific charge/discharge capacities was based on the mass of sulfur and the compound, respectively.

The structures of the cathode electrode before and after cycling were examined using a field emission STEM (Hitachi HF-3300) at 15 kV. The elemental mapping of the samples was also taken using STEM. X-ray diffraction (XRD) analysis was performed at a PANalytical X'pert PRO2-circle X-ray diffractometer with a CuKα radiation ($\lambda$=1.5418 Å). Raman spectroscopy was recorded from 600 to 100 cm$^{-1}$ on a Renishaw Confocal MicroRaman spectrometer at room temperature.

Figure 14:
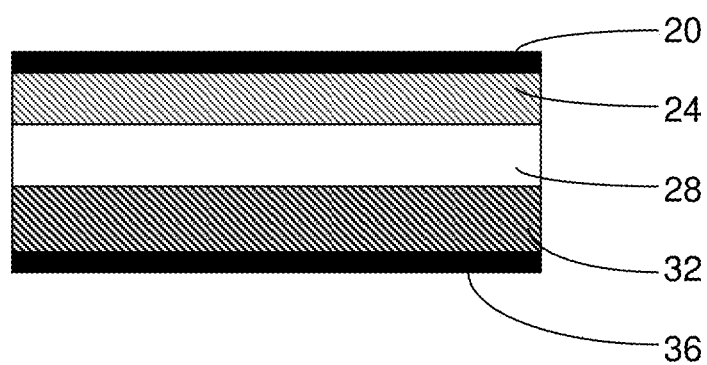
FIG. 14 is a schematic diagram of a lithium-sulfur cell according to the invention.

A cell according to the invention can have any suitable construction. A lithium-sulfur cell comprising $Li_3PS_{4+n}$ (0<n<9) is shown in FIG. 14. The cell can include, for example, current collector 20, anode 24, electrolyte 28, cathode 32, and current collector 36. The cathode 32 includes $Li_3PS_{4+n}$ (0<n<9).

The sulfur compound of the invention has a superionic conductivity of 2.5×10$^{-5}$ S cm$^{-1}$ at 25° C., and is a good cathode material with a high initial discharge capacity of 1,300 mAh g$^{-1}$, almost 100% coulombic efficiency, and about 60% capacity retention after 300 cycles at RT. The excellent cycling performance is due to the enhancement of the ionic conductivity of the sulfur compound without depending on the liquid electrolyte and subsequently the elimination of polysulfide shuttle. The importance of the ionic conductivity is confirmed by the improved cycling performance, energy efficiency, and rate capabilities at 60° C. due to the enhancement of the ionic conductivity by one order of magnitude to $1.0 \times 10^{-4}$ S cm$^{-1}$.

Although this sulfur compound was tested in solid state lithium batteries, it could be used as an electrolyte for sensors, solar cells, and supercapacitors. A wide variety of compounds with good ionic conductivity could be synthesized and find broad applications in many areas of materials science, in addition to the electrode materials for high energy density rechargeable lithium batteries.

This invention can be embodied in other forms without departing from the spirit of the invention, and therefore reference should be had to the following claims as indicating the scope of the invention:

We claim:

1. A method of making a cathode for a battery, comprising the steps of:
    reacting sulfur with $Li_3PS_4$ in a liquid solvent to provide a composition comprising $Li_3PS_{4+n}$ (0<n<9), where n is an integer;
    creating a slurry with the compound, a binder and carbon; and
    coating a current collector with the slurry and forming a cathode with the slurry.

2. The method of claim 1, wherein the solvent is at least one selected from the group consisting of tetrahydrofuran, acetonitrile, dimethoxyethane, glyme solvents and ethers.

3. The method of claim 1, wherein $Li_3PS_{4+n}$ comprises $Li_3PS_5$.

4. The method of claim 1, wherein $Li_3PS_{4+n}$ comprises $Li_3PS_6$.

5. The method of claim 1, wherein $Li_3PS_{4+n}$ comprises $Li_3PS_7$.

6. The method of claim 1, wherein $Li_3PS_{4+n}$ comprises $Li_3PS_8$.

7. The cathode of claim 1, wherein $Li_3PS_{4+n}$ comprises $Li_3PS_9$.

8. The method of claim 1, wherein $Li_3PS_{4+n}$ comprises $Li_3PS_{10}$.

9. The method of claim 1, wherein $Li_3PS_{4+n}$ comprises $Li_3PS_{11}$.

10. The method of claim 1, wherein $Li_3PS_{4+n}$ comprises $Li_3PS_{12}$.

11. A method of making a battery, comprising the steps of:
    preparing a cathode, comprising the steps of reacting sulfur with $Li_3PS_4$ in a liquid solvent to provide a composition comprising $Li_3PS_{4+n}$ (0<n<9), where n is an integer;
    creating a cathode slurry with the composition, a binder and carbon;
    coating a current collector with the slurry to form a cathode; and
    combining the cathode with an electrolyte and an anode to form a battery.

12. The method of claim 11, wherein the solvent is at least one selected from the group consisting of tetrahydrofuran, acetonitrile, dimethoxyethane, glyme solvents and ethers.

13. The method of claim 11 wherein the anode comprises at least one selected from the group consisting of lithium, silicon, silicon monoxide, tin, and tin oxide.

14. The method of claim 11, wherein $Li_3PS_{4+n}$ comprises $Li_3PS_5$.

15. The method of claim 11, wherein $Li_3PS_{4+n}$ comprises $Li_3PS_6$.

16. The method of claim 11, wherein $Li_3PS_{4+n}$ comprises $Li_3PS_7$.

17. The method of claim 11, wherein $Li_3PS_{4+n}$ comprises $Li_3PS_8$.

18. The cathode of claim 11, wherein $Li_3PS_{4+n}$ comprises $Li_3PS_9$.

19. The method of claim 11, wherein $Li_3PS_{4+n}$ comprises $Li_3PS_{10}$.

20. The method of claim 11, wherein $Li_3PS_{4+n}$ comprises $Li_3PS_{11}$.

21. The method of claim 11, wherein $Li_3PS_{4+n}$ comprises $Li_3PS_{12}$.

* * * * *